(No Model.)
J. HADFIELD.
REEVING DEVICE.
No. 524,247.  Patented Aug. 7, 1894.
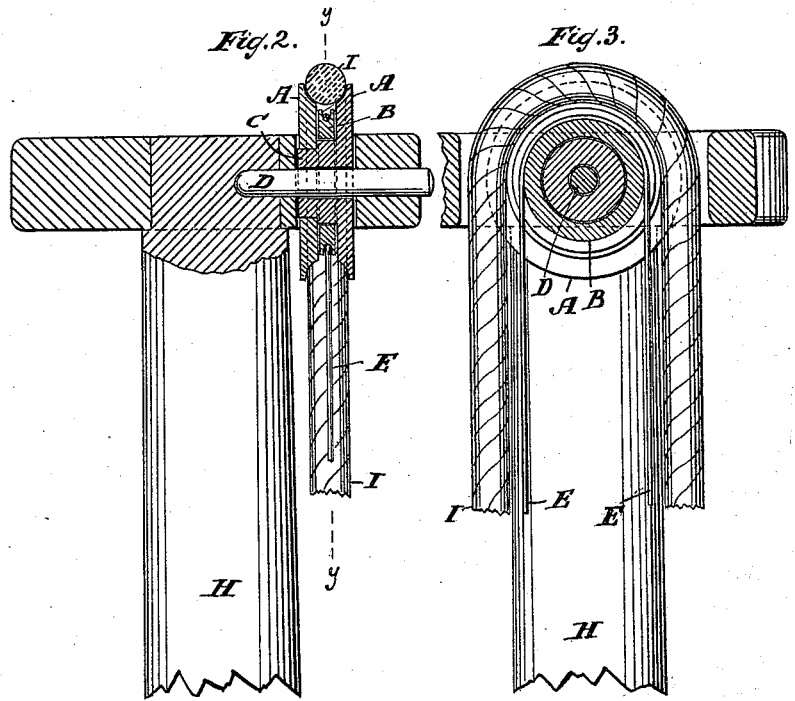
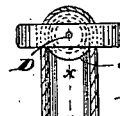
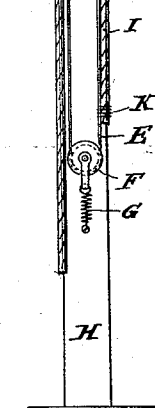
WITNESSES:
E. Wolff
Chas. E. Poensgen
INVENTOR:
Joseph Hadfield.
BY
Hauff & Hauff
ATTORNEYS.

UNITED STATES PATENT OFFICE.

JOSEPH HADFIELD, OF NEW YORK, N. Y., ASSIGNOR TO AUGUST M. FAY, OF EAST ORANGE, NEW JERSEY.

REEVING DEVICE.

SPECIFICATION forming part of Letters Patent No. 524,247, dated August 7, 1894.

Application filed December 26, 1893. Serial No. 494,777. (No model.)

*To all whom it may concern:*

Be it known that I, JOSEPH HADFIELD, a citizen of the United States, residing at New York, in the county and State of New York, have invented new and useful Improvements in Reeving Devices, of which the following is a specification.

The object of this invention is to provide a device suitable for reeving lines or halyards on various localities as for example flag staffs, pulleys and the like and the invention consists in the novel features set forth in the following specification and claims and illustrated in the annexed drawings, in which—

Figure 1 is an elevation of the reeving device. Fig. 2 is a section along $xx$ Fig. 1. Fig. 3 is a section along $yy$ Fig. 2.

In the drawings is shown a main pulley or sheave composed of cheek pieces A, between which is arranged a supplemental pulley or sheave B adapted to run loosely or independent of the main pulley. The main pulley is constructed with a hub C formed integral with one of the cheek-pieces, and rigidly secured to the other cheek piece, the supplemental pulley or sheave B being mounted on the hub. A shaft D can be made to extend through hub C. About the idler B is looped a strand or wire E which in Fig. 1 is shown guided about a pulley F held taut by a spring G secured in a suitable locality as to a flag pole H.

In case a line or halyard as I is to be reeved one end of line I is temporarily secured to the loop or wire E by suitable fastening as thread or wire K. The cord or wire E being then started running, the line I will be drawn to the main pulley and reeved about said pulley, as seen in Fig. 1, after which said line I can be detached from the wire E. The line I can now be run back and forth about the main pulley as required, the pulley B being allowed to remain idle. The line I can manifestly be removed as required, and can be readily replaced when needed by aid of the wire E.

The device can be used not only for reeving lines on flag staffs, but also for other purposes, as for example in mounting wash lines, which latter are advantageously taken in when not in use so as to be preserved from the effects of the weather.

The cheek-pieces A may or may not be rigidly fixed to the hub C, but care should be exercised to prevent spreading of the cheek-pieces, so that the strand or wire E, which engages the annular groove in the supplemental pulley or sheave B is not liable to become disengaged therefrom.

What I claim as new, and desire to secure by Letters Patent, is—

1. The combination of a main pulley or sheave adapted to support a line, a supplemental pulley or sheave arranged within and rotatably independent of the main pulley or sheave and provided with an annular groove, and a strand or wire engaging the annular groove in the supplemental pulley or sheave for running the line over the main pulley or sheave, substantially as described.

2. The combination of a main pulley or sheave composed of two cheek-pieces, one having a hub secured to the other and adapted to support a line running thereover, a supplemental pulley or sheave having an annular groove and running independently on the said hub, and a strand or wire engaging the annular groove of the supplemental pulley or sheave for running the line over the main pulley or sheave, substantially as described.

In testimony whereof I have hereunto set my hand in the presence of two subscribing witnesses.

JOSEPH HADFIELD.

Witnesses:
WM. C. HAUFF,
E. F. KASTENHUBER.